US010857920B2

(12) United States Patent
Morrow

(10) Patent No.: US 10,857,920 B2
(45) Date of Patent: Dec. 8, 2020

(54) BACKREST FOR A VEHICLE SEAT

(71) Applicant: Faurecia Automotive Seating, LLC, Auburn Hills, MI (US)

(72) Inventor: Michael Morrow, Royal Oak, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 9 days.

(21) Appl. No.: 16/357,663

(22) Filed: Mar. 19, 2019

(65) Prior Publication Data
US 2020/0298736 A1 Sep. 24, 2020

(51) Int. Cl.
| *B60N 2/60* | (2006.01) |
| *B60N 2/68* | (2006.01) |
| *B60N 2/90* | (2018.01) |
| *B60N 2/66* | (2006.01) |
| *B60N 2/22* | (2006.01) |
| *A47C 7/46* | (2006.01) |

(52) U.S. Cl.
CPC ............ *B60N 2/686* (2013.01); *B60N 2/665* (2015.04); *B60N 2/914* (2018.02); *A47C 7/467* (2013.01); *B60N 2/2222* (2013.01)

(58) Field of Classification Search
CPC ...... B60N 2/2222; B60N 2/914; B60N 2/686; B60N 2/665; A47C 7/467
See application file for complete search history.

(56) References Cited

U.S. PATENT DOCUMENTS

| 5,137,329 | A | * | 8/1992 | Neale | A47C 7/467 |
| | | | | | 297/284.6 |
| 5,772,281 | A | * | 6/1998 | Massara | B60N 2/643 |
| | | | | | 297/284.4 |
| 5,833,312 | A | | 11/1998 | Lenz | |
| 5,884,968 | A | * | 3/1999 | Massara | B60N 2/23 |
| | | | | | 297/216.12 |
| 6,158,812 | A | | 12/2000 | Bonke | |
| 6,203,105 | B1 | | 3/2001 | Rhodes, Jr. | |
| 6,283,547 | B1 | * | 9/2001 | Bauer | B60N 2/914 |
| | | | | | 297/284.1 |
| 6,331,014 | B1 | | 12/2001 | Breed | |
| 6,550,856 | B1 | * | 4/2003 | Ganser | B60N 2/20 |
| | | | | | 297/61 |
| 6,604,788 | B1 | * | 8/2003 | Humer | B60N 2/4228 |
| | | | | | 297/216.13 |
| 6,746,078 | B2 | | 6/2004 | Breed | |
| 6,802,562 | B1 | | 10/2004 | Hake | |
| 6,805,404 | B1 | | 10/2004 | Breed | |
| 7,588,115 | B2 | | 9/2009 | Breed | |
| 8,033,610 | B2 | * | 10/2011 | Graber | B60N 2/2222 |
| | | | | | 297/284.1 |
| 8,534,703 | B1 | | 9/2013 | Baldwin | |
| 8,668,225 | B2 | * | 3/2014 | Yamaki | B60N 2/4235 |
| | | | | | 280/730.2 |
| 9,415,713 | B2 | | 8/2016 | Line | |
| 9,707,870 | B2 | | 7/2017 | Line | |
| 9,707,873 | B2 | | 7/2017 | Line | |
| 9,873,362 | B2 | | 1/2018 | Line | |
| 9,889,773 | B2 | * | 2/2018 | Line | B60N 2/2222 |
| 9,896,003 | B2 | * | 2/2018 | Tamura | B60N 2/2222 |
| 10,166,887 | B2 | * | 1/2019 | Damerow | B60N 2/72 |

(Continued)

*Primary Examiner* — Syed A Islam
(74) *Attorney, Agent, or Firm* — Barnes & Thornburg LLP

(57) ABSTRACT

A vehicle seat for supporting an occupant in a vehicle. The vehicle seat includes a backrest and a headrest.

18 Claims, 7 Drawing Sheets

(56) References Cited

U.S. PATENT DOCUMENTS

| | | | |
|---|---|---|---|
| 10,358,054 B2* | 7/2019 | Durkee | B60N 2/643 |
| 10,358,065 B2* | 7/2019 | McMillen | B60N 2/914 |
| 10,427,554 B2* | 10/2019 | Ketels | B60N 2/002 |
| 10,427,556 B2* | 10/2019 | Bortolon | B60N 2/233 |
| 10,493,882 B1* | 12/2019 | Romelfanger | B60N 2/2222 |
| 10,525,854 B2* | 1/2020 | Alexander | B60N 2/665 |
| 2002/0060485 A1 | 5/2002 | Fischer | |
| 2011/0163574 A1 | 7/2011 | Tame | |
| 2013/0320742 A1* | 12/2013 | Murolo | B60N 2/682 |
| | | | 297/452.18 |
| 2016/0096448 A1* | 4/2016 | Line | B60N 2/224 |
| | | | 297/354.11 |
| 2018/0222362 A1* | 8/2018 | Line | B60N 2/643 |

* cited by examiner

BACKREST FOR A VEHICLE SEAT

BACKGROUND

The present disclosure relates to an occupant support, and particularly to an occupant support used in a vehicle. More particularly the present disclosure relates to a backrest included in a vehicle seat.

SUMMARY

According to the present disclosure, a vehicle seat of a vehicle includes a seat bottom and a seat back coupled to the seat bottom to extend upwardly away from the seat bottom. The seat back includes a backrest and a headrest arranged to locate the backrest between the headrest and the seat bottom.

In illustrative embodiments, the backrest includes a biasing member and an actuator in an upper end of the backrest that is adapted to position the back of an occupant in a comfortable position with respect to the backrest and to position the back end of a head of the occupant a comfortable distance away from a front surface of the headrest during normal seating conditions.

In illustrative embodiments, the backrest includes a support shield coupled to a frame of the backrest for pivotal movement with respect to the frame between an extended position and a retracted position. The actuator is sandwiched between the frame and the support shield. The biasing member resiliently biases the support shield toward the retracted position of the support shield and toward the actuator.

In illustrative embodiments, the actuator is adapted to selectively pivot the support shield with respect to the frame of the backrest to a desired sedating position between the extended position and the retracted position of the support shield as selected by the occupant for maximum seating comfort.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 2:
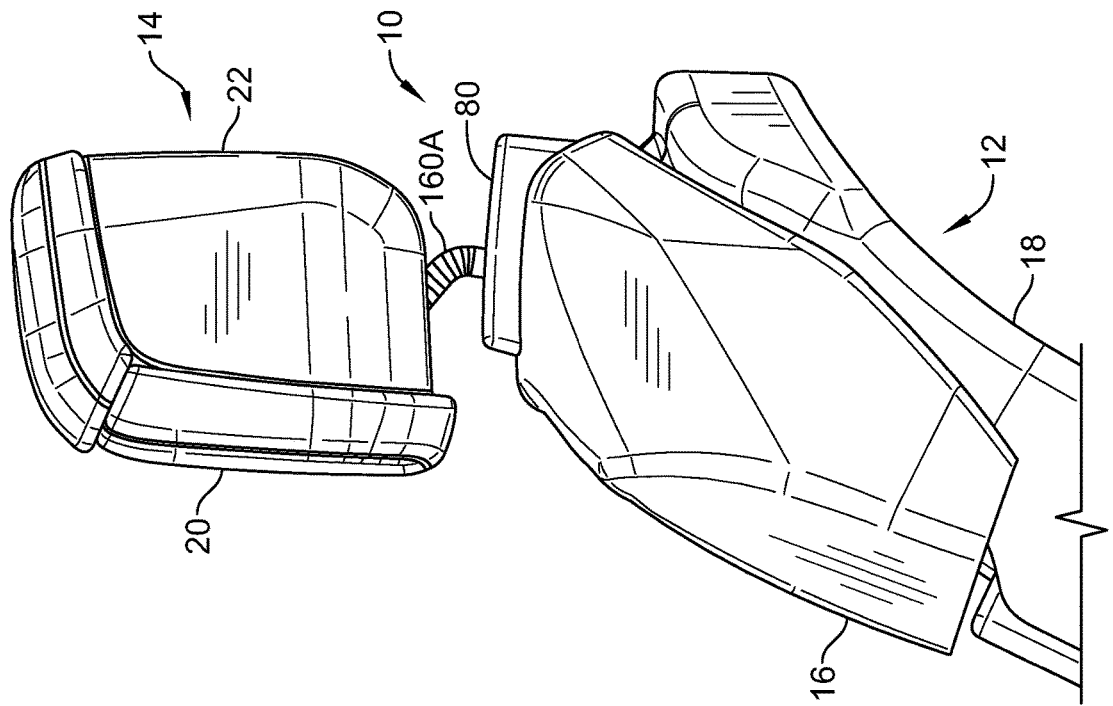
FIG. 2 is a side elevational view of the vehicle seat shown with the support shield in the retracted position with respect to the frame of the backrest and the headrest.
Figure 1:
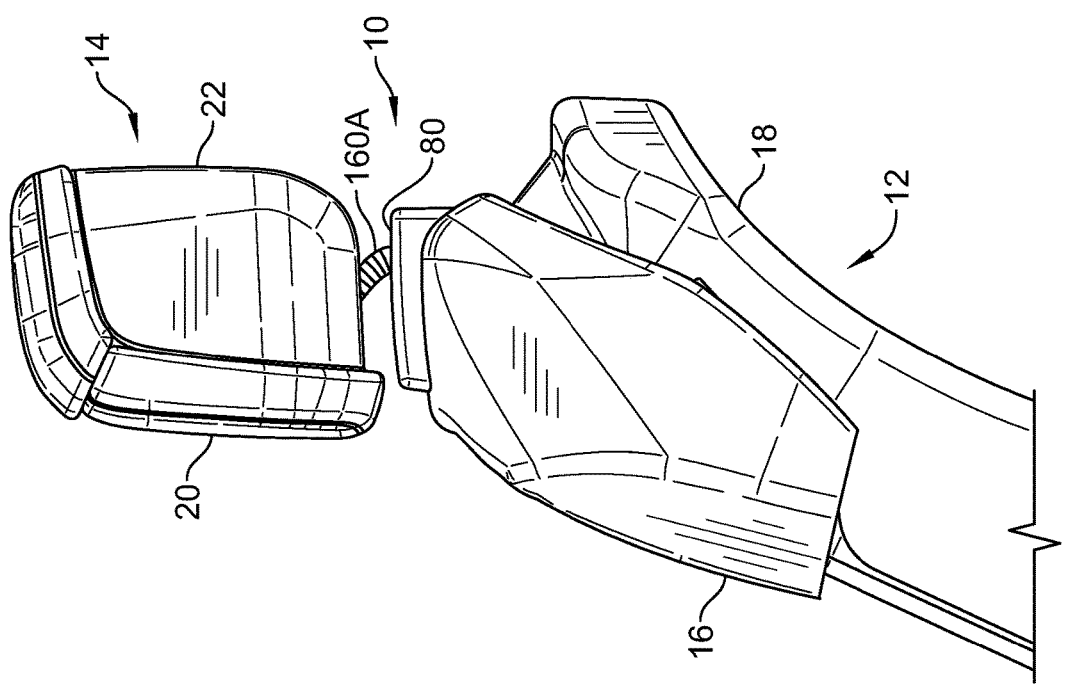
FIG. 1 is a side elevational view of the vehicle seat of the present disclosure shown with the support shield of the backrest of the vehicle seat in the extended position with respect to the frame of the backrest and the headrest.

An occupant support, such as a vehicle seat 10, in accordance with the present disclosure, includes a seat back having a backrest 12 and a headrest 14 coupled to an upper end of backrest 12 as shown in FIG. 1. A bottom end of backrest 12 is connected to a seat bottom of the vehicle seat and the seat bottom is adapted to be connected to a floor of a vehicle. Backrest 12 includes a front 16 and a back 18, and headrest 14 includes a front 20 and a back 22 as shown in FIGS. 1 and 2.

Figure 4:
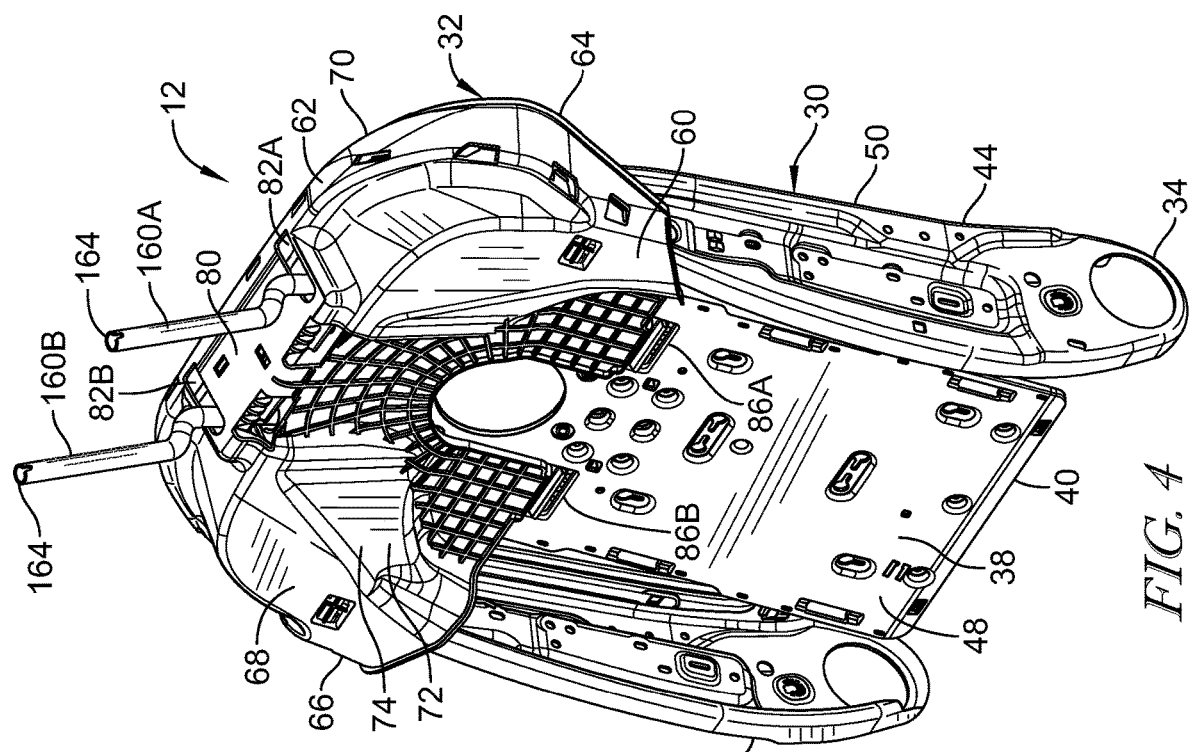
FIG. 4 is a perspective view of the backrest of the vehicle seat shown with the support shield in the retracted position.
Figure 3:
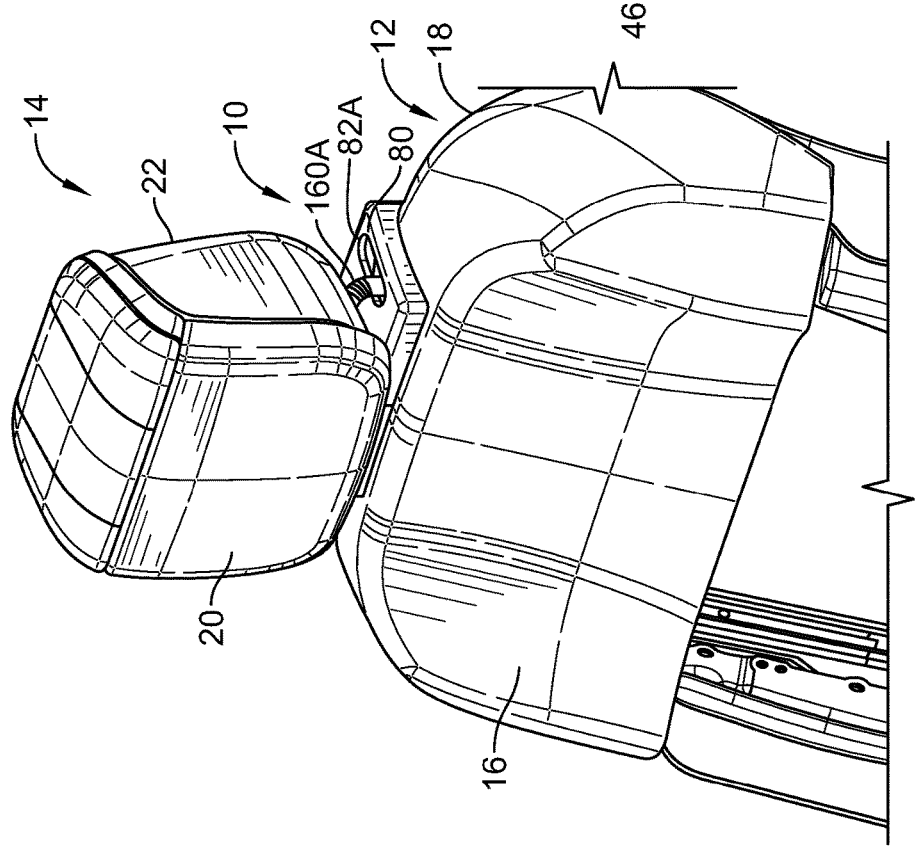
FIG. 3 is a partial perspective view of the vehicle seat shown with the support shield in the retracted position with respect to the frame of the backrest and the headrest.

Backrest 12 includes a support frame 30 and a support shield 32 pivotally coupled to support frame 30 as shown in FIGS. 3 and 4. Support frame 30 and support shield 32 are located within an interior of backrest 12 between a front trim, having a front surface, and a rear trim, having a rear surface, of backrest 12. In some examples, the front and rear trims include a scrim, fabric, leather, synthetic leather, combinations thereof, of any other suitable alternative.

Figure 6:
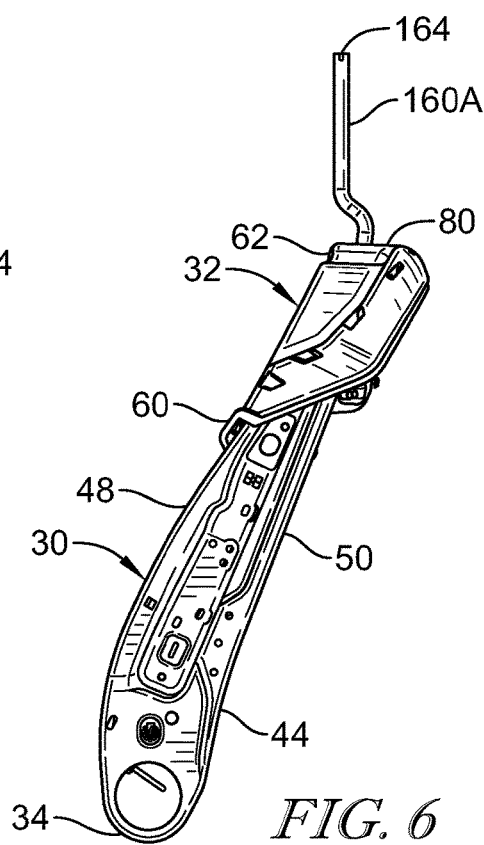
FIG. 6 is a side elevational view of the backrest of the vehicle seat shown with the support shield in the retracted position.

Support frame 30 includes a bottom end 34 and a top end 36 as shown in FIGS. 4 and 6. Support frame 30 includes a center support member 38 having a bottom end 40 and a top end 42. Support frame 30 includes a left leg 44 and a right leg 46 located on opposite sides of center support member 38. The bottom ends of left leg 44 and right leg 46 are adapted to connect support frame 30 and backrest 12 to the seat bottom of vehicle seat 10. Support frame 30 includes a front 48 and a back 50.

Support shield 32 includes a bottom end 60, a top end 62, a left end 64, and a right end 66 FIGS. 4, 5, 7 and 8. Support shield 32 also includes a front 68 and a back 70. Support shield 32 includes a shoulder support 72 that extends from bottom end 60 to top end 62 of support shield 32. Shoulder support 72 includes a front surface 74 and a rear surface 76. Front surface 74 of shoulder support 72 is adapted to provide support to a shoulder area at the upper end of the torso of an occupant of vehicle seat 10.

Figure 5:
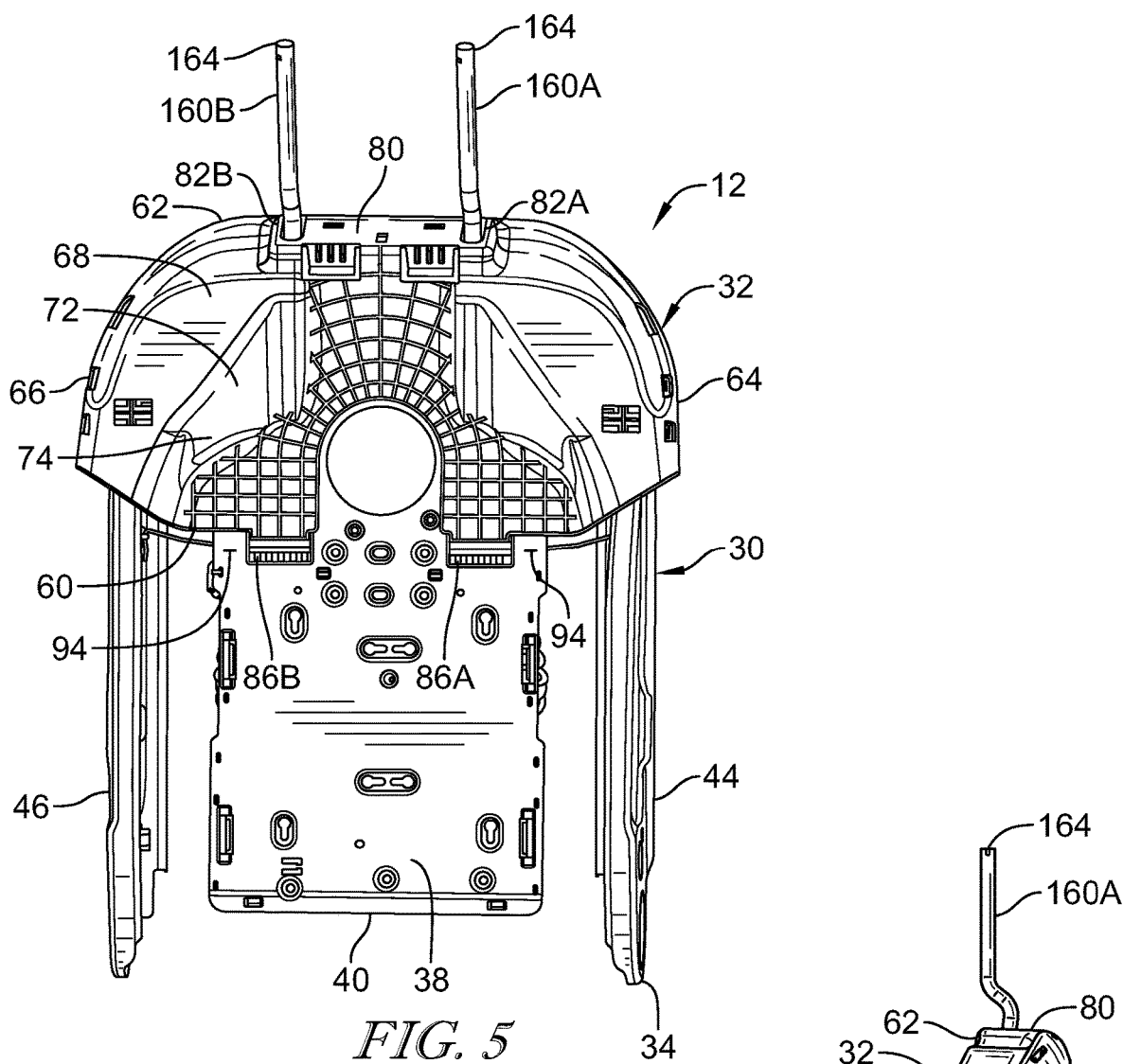
FIG. 5 is front elevational view of the backrest of the vehicle seat shown with the support shield in the retracted position.
Figure 7:
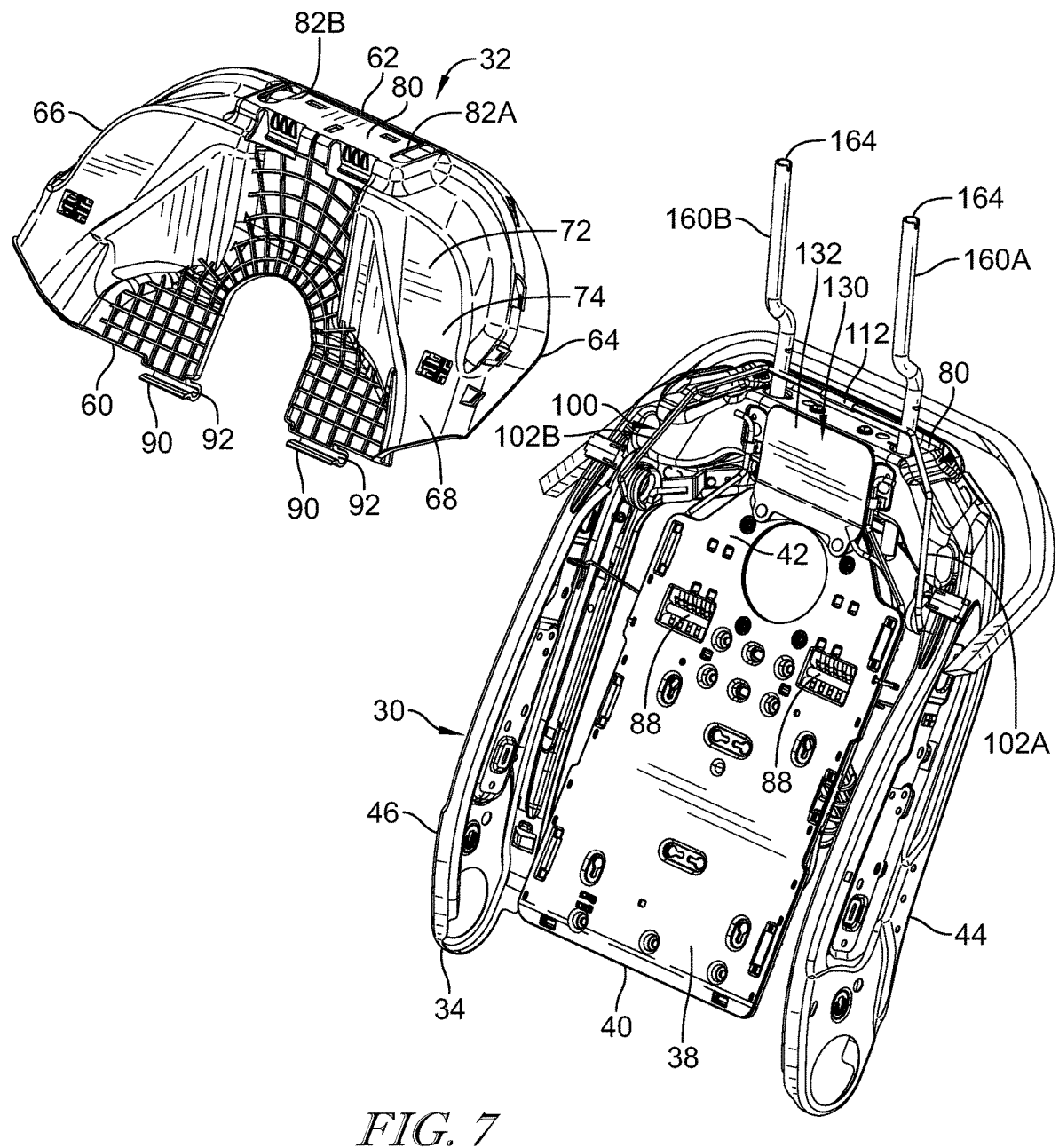
FIG. 7 is a partial exploded perspective view of the backrest shown with the support shield separated from the frame of the backrest.
Figure 8:
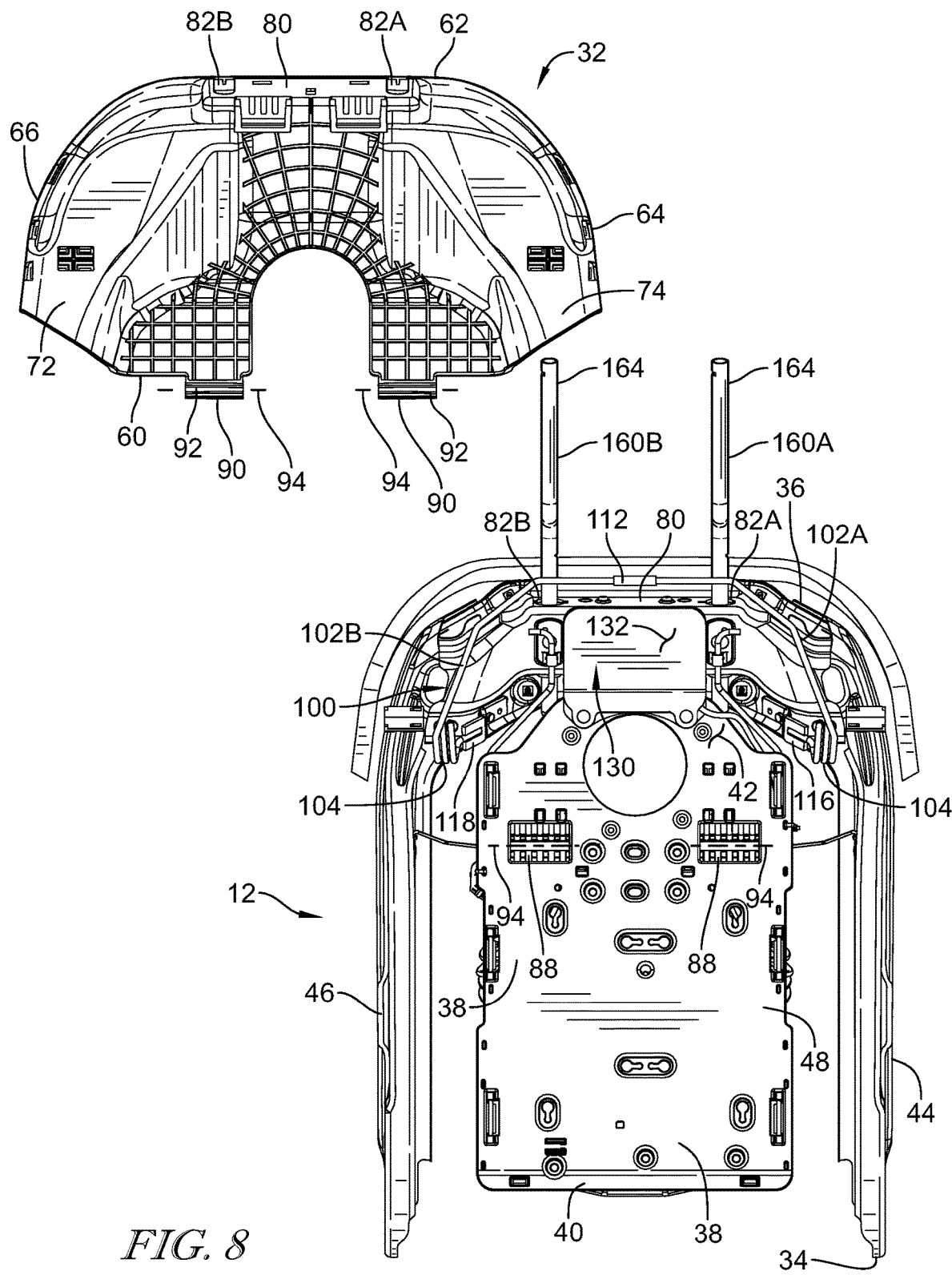
FIG. 8 is a partial exploded front elevational view of the backrest shown with the support shield separated from the frame of the backrest.
Figure 9:
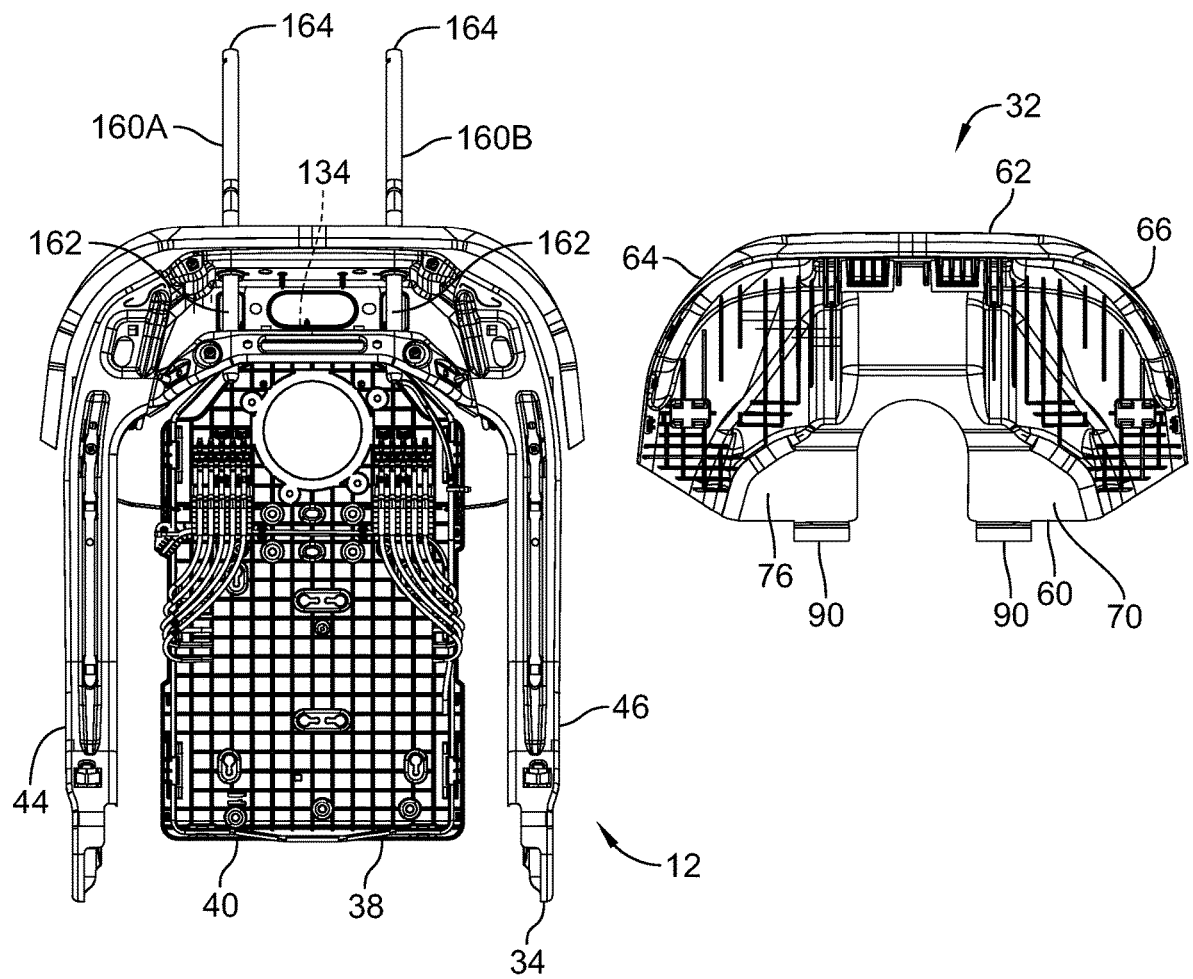
FIG. 9 is a partial exploded rear view of the backrest shown with the support shield separated from the frame of the backrest.

Support shield 32 also includes a shelf 80 at top end 62 of support shield 32 that extends rearwardly from the top end of shoulder support 72 as shown in FIGS. 1, 3-5, and 7. Shelf 80 includes generally parallel and spaced apart elongates slots 82A and 82B that extend generally perpendicular to front surface 74 of shoulder support 72. Bottom end 60 of support shield 32 is pivotally coupled to center support member 38 of support frame 30 by one or more hinges 86A and 86B as shown in FIGS. 4 and 5. Each hinge 86A-B includes an elongate pin or axle 88 that is connected to center support member 38 of support frame 30. Each hinge 86A-B also includes a generally C-shaped coupling member 90 having an elongate generally cylindrical receptacle 92 as suggested in FIGS. 7 and 8. An axle 88 is located within each receptacle 92 of coupling members 90 as shown in FIGS. 7 and 8. Hinges 86A-B are located approximately midway between bottom end 40 and top end 42 of center support member 38.

Support shield 32 is adapted to pivot with respect to support frame 30 about a generally linear pivot axis 94 that extends generally concentrically and longitudinally through axles 88 of hinges 86A-B as suggested in FIGS. 5, 7, and 8. Support shield 32 is adapted to pivot with respect to support frame 30 about pivot axis 94 between an extended position as shown in FIG. 1, wherein the top end of shoulder support 72 is spaced apart from top end 36 of support frame 30, and a retracted position as shown in FIGS. 2-4, wherein the top end of shoulder support 72 is located closely to or in engagement with support frame 30.

Figure 10:
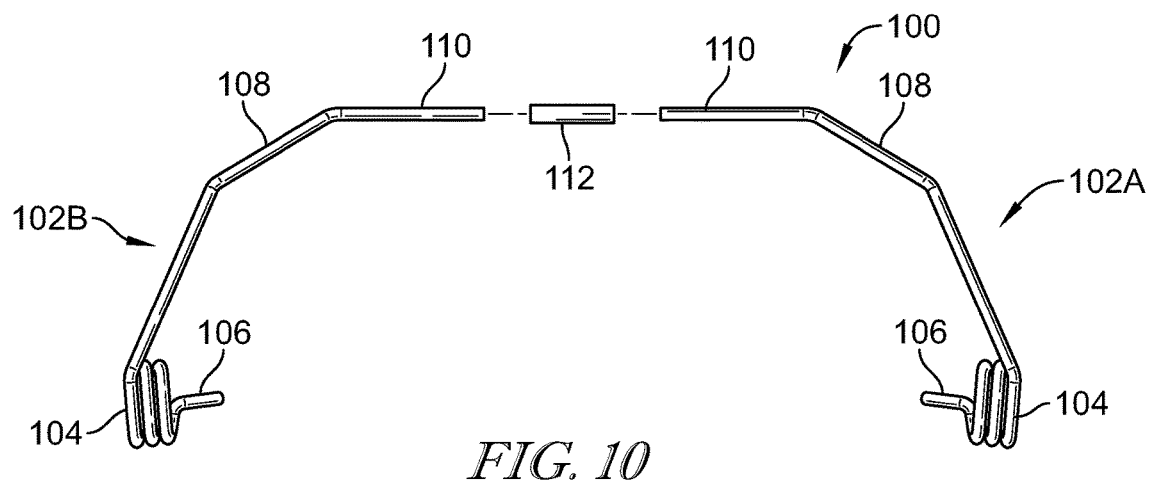
FIG. 10 is an exploded front elevational view of the biasing member of the backrest.

Support frame 30 includes a resilient biasing member 100 adapted to resiliently bias support shield 32 from the extended position toward the retracted position of support shield 32 as shown in FIGS. 7 and 8. Biasing member 100, as shown in FIG. 10, includes one or more torsion springs 102A-B. Each torsion spring 102A-B includes a generally helical coil 104. A connector member 106 extends outwardly from a first end of each coil 104, and an elongate arm 108 extends outwardly from a second end of each coil 104. Each arm 108 includes an outer end 110. Outer ends 110 of torsion springs 102A and 102B may be coupled together by inserting outer ends 110 within a bore of a generally cylindrical and tubular coupler 112. Each torsion spring 102A and 102B may be formed from an elongate generally cylindrical rod as suggested in FIG. 10. Each arm 108 is generally L-shaped such that when torsion springs 102A-B are coupled together, biasing member 100 is formed in a generally inverted U-shape.

Connector member 106 of torsion spring 102A is connected to an upper end of left leg 44 of support frame 30 by a bracket 116 as suggested in FIG. 8. Connector member 106 of torsion spring 102B is coupled to an upper end of right leg 46 of support frame 30 by a bracket 118. Arms 108 of torsion springs 102A-B of biasing member 100 engage and are coupled to back 70 of support shield 32. Arms 108 of torsion springs 102A-B are resiliently pivotal with respect to connector members 106 about pivot axes that extend concentrically through coils 104. Coils 104 resiliently bias arms 108 from an extended position, wherein support shield 32 is in the extended position, toward a retracted position of arms 108 wherein support shield 32 is in the retracted position of support shield 32.

Backrest 12 also includes an actuator, such as a flexible bladder 130 located in the interior of backrest 12 as shown in FIGS. 7 and 8. Bladder 130 is selectively inflatable from a collapsed deflated condition to an inflated expanded condition, and is selectively deflatable from the inflated expanded condition to the collapsed deflated condition. Flexible bladder 130 may be, in one example, inflated to a variety of positions between the collapsed deflated condition and the inflated expanded condition. Bladder 130 is located at top end 36 of support frame 30 and may be coupled to top end 42 of center support member 38 as shown in FIGS. 7 and 8. Bladder 130 extends and is sandwiched between support frame 30 and back 70 of support shield 32 and is located between the front skin and the back skin of backrest 12. Biasing member 100 resiliently biases support shield 32 from the extended position toward the retracted position of support shield 32, and toward and into engagement with bladder 130, such that bladder 130 is compressed between support shield 32 and frame 30.

Figure 11:
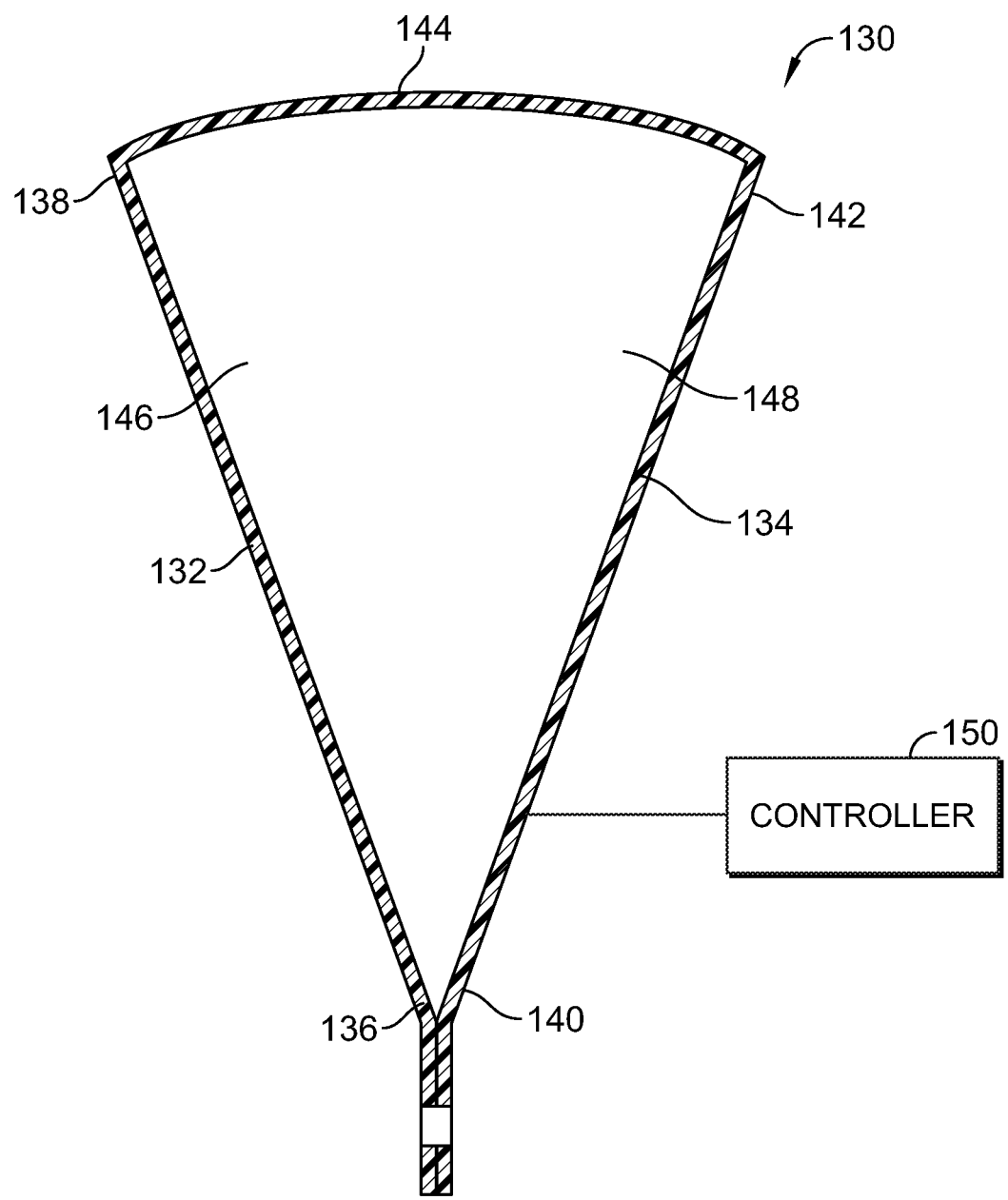
FIG. 11 is a side elevational view of the actuator of the backrest.

As shown in FIG. 11, bladder 130 may be formed in the general shape of a wedge. Bladder 130 may also be formed in other configurations, such as a rectangular parallelepiped or with accordion-shaped walls. Bladder 130 includes a generally rectangular and planar front wall 132 and a generally rectangular and planar rear wall 134. Front wall 132 includes a bottom end 136 and a top end 138. Rear wall 134 includes a bottom end 140 and a top end 142. Bladder 130 includes a top wall 144 that extends between top end 138 of front wall 132 and top end 142 of rear wall 134. Bottom end 136 of front wall 132 and bottom end 140 of rear wall 134 may be located closely together and may be directly coupled together in engagement with one another. Bladder 130 includes spaced apart opposing side walls 146 that respectively extend between left ends of front wall 132, rear wall 134, and top wall 144, and between right ends of front wall 132, rear wall 134, and top wall 144. If desired, bladder 130 may include a bottom wall that extends between bottom end 136 of front wall 132 and bottom end 140 of rear wall 134. Bladder 130 includes a sealed hollow interior chamber 148 formed within front wall 132, rear wall 134, top wall 144, and side walls 146. Interior chamber 148 is adapted to receive and contain a volume of a gas, such as air. Bladder 130 may be formed from a flexible plastic material.

Bladder 130 is selectively collapsible and deflatable from a fully inflated and expanded condition, as shown in FIG. 11, wherein a predetermined volume of gas is sealingly enclosed within interior chamber 148 of bladder 130, to a fully deflated and collapsed condition by venting or discharging gas within interior chamber 148 outwardly from bladder 130. Bladder 130 is selectively inflatable and expandable from the fully deflated and collapsed condition to the fully inflated and expanded condition by supplying a selected volume of gas into interior chamber 148 of bladder 130. Front wall 132 of bladder 130 is spaced apart from rear wall 134 of bladder 130 a first distance when bladder 130 is in the inflated and expanded condition. Front wall 132 of bladder 130 is spaced apart from rear wall 134 of bladder 130 a second distance, which is shorter then the first distance, when bladder 130 is in the inflated and expanded condition. Front wall 132 of bladder 130, or a portion thereof such as top end 138, moves closer to rear wall 134 of bladder 130, or a portion thereof such as top end 142, as gas is vented from chamber 148 and bladder deflates. Front wall 132 of bladder 130, or a portion thereof such as top end 138, moves farther away from rear wall 134 of bladder 130, or a portion thereof such as top end 142, as gas is supplied into chamber 148 and bladder 130 inflates.

Bladder 130 includes a pneumatic controller 150, such as a valve, in fluid communication with chamber 148 of bladder 130 that is adapted to selectively discharge or vent a selected volume of gas from interior chamber 148 outwardly from bladder 130 to deflate bladder 130 a selected amount, and that is adapted to selectively supply a selected volume of gas into chamber 148 of bladder 130 to inflate bladder 130 a selected amount. Pneumatic controller 150 is adapted to be coupled in fluid communication with a supply of compressed gas. When pneumatic controller 150 vents gas within interior chamber 148 outwardly from bladder 130, front wall 132 and rear wall 134 of bladder 130 move closer together and potentially in engagement with one another, whereupon bladder 130 is moving toward the collapsed and deflated condition. When pneumatic controller 150 supplies gas into interior chamber 148 of bladder 130, front wall 132 and rear wall 134 of bladder 130 move farther apart from one another, whereupon bladder 130 is moving toward the expanded and inflated condition. Front wall 132 of bladder 130 may generally pivot with respect to rear wall 134 of bladder 130 about bottom end 136 of front wall 132.

Pneumatic controller 150 may comprise an inflation mechanism for supplying a selected volume of gas into chamber 148 of bladder 130, and a deflation mechanism for venting a selected volume of gas from chamber 148 of bladder 130. A fail-safe venting mechanism may also be in fluid communication with chamber 148 of bladder 130. When a selected predetermined compressive force is applied to bladder 130 and the pressure of the gas within bladder 130 increases to a predetermined level, such as when the vehicle may receive a rear-end impact force, the fail-safe venting mechanism quickly vents gas within interior chamber 148 is outwardly from bladder 130 such that bladder 130 quickly deflates and collapses.

Headrest supports 160A-B couple headrest 14 to top end 36 of support frame 30 of backrest 12 as shown in FIGS. 1-9. Each headrest support 160A-B includes a bottom end 162 that is coupled to support frame 30 and a top end 164 that is coupled to headrest 14. Each headrest support 160A-B may be generally formed from an elongate rod. Headrest supports 160A-B may be vertically adjustable with respect to support frame 30 to provide vertical height adjustment of headrest 14 with respect to the top end of backrest 12. Headrest supports 160A-B fixedly connect headrest 14 to support frame 30 to prevent relative horizontal movement of headrest 14 with respect to support frame 30 when the head of an occupant in vehicle seat 10 impacts front 20 of headrest 14, such as when the vehicle in which occupant is seated receives a rear-end impact force, such as from a rear-end collision. Headrest supports 160A-B prevent movement of headrest 14 with respect to support frame 30 in a forward and rearward direction.

Backrest 12 provides a selectively adjustable and improved seating position, with improved comfort, for an occupant seated in and supported by vehicle seat 10 during normal seating and driving conditions. Support shield 32 is in the extended position as shown in FIG. 1, and is biased into engagement with front wall 132 of bladder 130 and toward the retracted position of support shield 32 by biasing member 100. When support shield 32 is in the extended position as shown in FIG. 1, headrest supports 160A-B are located adjacent rear ends of slots 82A-B of shelf 80 in support frame 30, and the back of the torso of the occupant is in engagement with and supported by the front surface of the front skin of backrest 12. The back end of the head of the occupant is spaced apart from front 20 of headrest 14 by a first headrest backset distance.

Support shield 32 is in the retracted position as shown in FIG. 2, and is biased into engagement with front wall 132 of bladder 130 and toward the retracted position of support shield 32 by biasing member 100. When support shield 32 is in the retracted position as shown in FIG. 2, headrest supports 160A-B are located adjacent front ends of slots 82A-B of shelf 80 in support frame 30, and the back of the torso of the occupant is in engagement with and supported by the front surface of the front skin of backrest 12. The back end of the head of the occupant is spaced apart from front 20 of headrest 14 by a second headrest backset distance which is shorter than the first headrest backset distance. Biasing member 100 resiliently biases support shield 32 from the extended position toward the retracted position and thereby compresses bladder 130 between support shield 32 and support frame 30 with a compressive force.

When bladder 130 is inflated and expands, front wall 132 of bladder 130 moves outwardly away from rear wall 134 of bladder 130, and bladder 130 pivots support shield 32 with respect to frame 30 toward the extended position of support shield 32. When bladder 130 is deflated and collapses, front wall 132 of bladder 130 moves closer toward rear wall 134 of bladder 130, and biasing member 100 pivots support shield 32 with respect to frame 30 toward the retracted position of support shield 32. Support shield 32 is selectively positionable by the occupant to any desired seating position, and angle with respect to frame 30, between the fully extended position of support shield 32 and the fully retracted position of support shield 32 by the selective inflation and deflation of bladder 130.

The present disclosure relates to a backrest having a pivotal support shield, and an expandable and collapsible bladder for selectively positioning the support shield in a desired seating position with respect to the frame of the backrest, to place the occupant in an improved normal seating position with respect to the vehicle seat for increased occupant comfort.

The invention claimed is:

1. A backrest for a vehicle seat adapted to support an occupant in a vehicle, the backrest comprising:
   a support frame;
   a support shield coupled to the support frame for pivotal movement about a first pivot axis with respect to the support frame between an extended position and a retracted position;
   an actuator extending between the frame and the support shield;
   a biasing member resiliently biasing the support shield toward the retracted position and arranged to pivot about a second pivot axis that is generally parallel to and spaced apart from the first pivot axis,
   wherein the actuator is adapted to selectively position the support shield in a selected seating position between the extended position and the retracted position of the support shield.

2. The backrest of claim 1, wherein the actuator comprises a bladder having an interior chamber adapted to include a volume of a gas, the bladder being selectively inflatable to an expanded condition, wherein the bladder pivots the support shield toward the extended position of the support shield, and selectively deflatable to a collapsed condition, wherein the bladder allows the support shield to pivot toward the retracted position of the support shield, the bladder supporting the support shield in the selected seating position.

3. The backrest of claim 1, wherein the bladder is formed from a flexible material.

4. The backrest of claim 1, wherein the bladder includes a front wall and a rear wall, the chamber being located between the front wall and the rear wall.

5. The backrest of claim 1, including a pneumatic controller for selectively venting gas in the chamber of the bladder from the bladder to deflate the bladder and for selectively supplying gas into the chamber of the bladder to inflate the bladder.

6. The backrest of claim 5, wherein the pneumatic controller comprises a valve and a fail-safe venting mechanism configured to vent gas when a predetermined compressive force is applied to the bladder and a pressure of the gas within the bladder increases to a predetermined level.

7. The backrest of claim 1, wherein the biasing member comprises a torsion spring.

8. The backrest of claim 7, wherein the the biasing member includes a first torsion spring and a second torsion spring connected to the first torsion spring, wherein the first torsion spring and the second torsion spring are pivotable about the second pivot axis and extend from a left end of the support shield to a right end of the support shield, are arranged to be symmetrical to each other, and shaped to follow an inner contour of a top surface of the support shield.

9. The backrest of claim 8, wherein the first torsion spring has a first elongate rod extending outwardly and upwardly relative to the frame from a first coil of the first torsion spring and the second torsion spring has a second elongate rod extending outwardly and upwardly relative to the frame from a second coil of the second torsion spring located on opposite the first coil of the first torsion spring, and wherein the first elongate rod and the second elongate rod are coupled together via a tubular coupler.

10. The backrest of claim 7, wherein the torsion spring includes a connector member rigidly coupled to the frame of the backrest.

11. The backrest of claim 1, wherein the support shield includes one or more headrest slots, each headrest slot having a first end and a second end.

12. The backrest of claim 11, including one or more headrest support members, each headrest support member extending through a respective headrest slot of the support shield and coupled to the frame of the backrest, the support shield being pivotal from the extended position, wherein each headrest support member is located at the first end of a headrest slot, toward the retracted position wherein each headrest support member is located at the second end of a headrest slot, and wherein each headrest slot is bounded at the first end and the second end by the support shield.

13. The backrest of claim 12, wherein the headrest support members remain stationarily coupled to the frame of the backrest as the support shield pivots with respect to the frame and with respect to the headrest support members from the extended position of the support shield toward the retracted position of the support shield.

14. The backrest of claim 1, wherein the support shield is located at an upper end of the frame of the backrest.

15. The backrest of claim 1, including a hinge pivotally connecting the support shield to the frame of the backrest.

16. The backrest of claim 15, wherein the hinge comprises a generally C-shaped member having a receptacle, and an axle received in the receptacle, the C-shaped member being pivotal with respect to the axle.

17. The backrest of claim 15, wherein the hinge is arranged on a planar center support member of the support frame, the center support member including a first hole located below the actuator, and wherein the support shield includes a corresponding second hole that is approximately concentric with the first hole.

18. A backrest for a vehicle seat adapted to support an occupant in a vehicle, the backrest comprising: a support frame; a support shield coupled to the support frame for pivotal movement about a first pivot axis with respect to the support frame between an extended position and a retracted position; and an actuator extending between the frame and the support shield, wherein the actuator is adapted to selectively position the support shield in a selected seating position between the extended position and the retracted position of the support shield, wherein the actuator comprises a bladder having an interior chamber adapted to include a volume of a gas, the bladder including a front wall and a rear wall that converge and contact each other at an inflation axis of the bladder, the interior chamber being located between the front wall and the rearwall, and wherein the bladder is selectively inflatable about the inflation axis to an expanded condition in which (i) the front wall is spaced apart from the rear wall except at the inflation axis and (ii) the front wall and the rear wall contact each other at the inflation axis, wherein the bladder pivots the support shield toward the extended position of the support shield, and is selectively deflatable about the inflation axis to a collapsed condition, wherein the bladder allows the support shield to pivot toward the retracted position of the support shield, the bladder supporting the support shield in the selected seating position, a biasing member resiliently biasing the support shield toward the retracted position and arranged to pivot about a second pivot axis that is parallel to and spaced apart from the first pivot axis, wherein the inflation axis is parallel to and spaced apart from the first pivot axis and the second pivot axis, and wherein the second pivot axis is located between the first pivot axis and the inflation axis.

\* \* \* \* \*